(12) United States Patent
Vits et al.

(10) Patent No.: US 7,144,085 B2
(45) Date of Patent: Dec. 5, 2006

(54) PASSENGER RESTRAINT SYSTEM

(75) Inventors: Charles G. Vits, Carmel, IN (US); Christopher W. Foye, Indianapolis, IN (US); John David Scelsi, Westfield, IN (US); Donald C. Boyle, Indianapolis, IN (US); Guy R. Dingman, Westfield, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 264 days.

(21) Appl. No.: 10/382,252

(22) Filed: Mar. 5, 2003

(65) Prior Publication Data

US 2003/0173817 A1 Sep. 18, 2003

Related U.S. Application Data

(60) Provisional application No. 60/362,203, filed on Mar. 5, 2002.

(51) Int. Cl.
*A62B 35/00* (2006.01)

(52) U.S. Cl. .................................................. 297/483
(58) Field of Classification Search ................. 297/483, 297/484, 253; 280/801.1; 254/290
See application file for complete search history.

(56) References Cited

U.S. PATENT DOCUMENTS

| 3,524,679 | A | * | 8/1970 | Lavenne ..................... 297/465 |
| 4,236,755 | A | * | 12/1980 | Pollitt et al. ................ 297/483 |
| 4,632,425 | A | * | 12/1986 | Barratt .................... 280/801.1 |
| 4,674,800 | A | | 6/1987 | Ensign |
| 4,973,083 | A | * | 11/1990 | Richards et al. ......... 280/801.1 |
| 5,123,673 | A | * | 6/1992 | Tame ...................... 280/801.1 |
| 5,429,418 | A | | 7/1995 | Lipper et al. |
| 5,624,135 | A | * | 4/1997 | Symonds ................. 280/801.1 |
| 5,685,604 | A | | 11/1997 | Kain |
| 5,733,014 | A | | 3/1998 | Murray |
| 5,797,654 | A | | 8/1998 | Stroud |
| 5,829,834 | A | | 11/1998 | Silverman |
| 6,007,156 | A | * | 12/1999 | Chang ........................ 297/465 |
| 6,009,839 | A | | 1/2000 | Kohn |
| 6,116,696 | A | * | 9/2000 | Widman et al. ............. 297/483 |
| 6,179,329 | B1 | * | 1/2001 | Bradley .................... 280/801.1 |
| 6,450,576 | B1 | * | 9/2002 | Rhein et al. ............. 297/250.1 |
| 6,485,055 | B1 | * | 11/2002 | Swayne et al. .......... 280/801.1 |
| 6,644,723 | B1 | * | 11/2003 | Motozawa ............... 296/65.12 |
| 6,688,700 | B1 | * | 2/2004 | Gupta et al. ........... 297/452.18 |
| 2002/0089163 | A1 | * | 7/2002 | Bedewi et al. ........... 280/801.1 |
| 2004/0012242 | A1 | * | 1/2004 | White ......................... 297/484 |

OTHER PUBLICATIONS

"Finally, lap-shoulder seat belts for school buses", SafeGuard School Bus Safety Seat brochure, Mar. 2002, 4 pages.
"Finally, lap-shoulder seat belts for school buses", SafeGuard Buckle Up with Confidence brochure, Jul. 2002, 4 pages.

* cited by examiner

*Primary Examiner*—Peter M. Cuomo
*Assistant Examiner*—Sarah B. McPartlin
(74) *Attorney, Agent, or Firm*—Barnes & Thornburg LLP

(57) ABSTRACT

A harness for restraining a passenger in the seat of a vehicle, such as, for example, a car, a van, or a bus, is provided. The harness may be configured to releasably couple with at least one rigid member mounted in the bight of the vehicle's seat between the seat's seat and back portions. The restraining harness may be a harness, a belt system, a child seat, or a booster seat, any of which may be configured to utilize any suitable coupling and to cooperate with the vehicle's own restraint system.

21 Claims, 10 Drawing Sheets

PASSENGER RESTRAINT SYSTEM

This patent application claims priority to and the benefit of U.S. Provisional Patent Application No. 60/362,203, filed 5 Mar. 2002.

BACKGROUND AND SUMMARY OF THE INVENTION

This disclosure relates to passenger restraint systems for use in vehicles, particularly, to supplemental passenger restraining or positioning harness systems.

Conventional three-point restraint systems combining a lap belt and an upper torso belt are well known. These three-point restraint systems are usually used with seats offering rigid support for the belts. As typically used in a vehicle, the three-point restraint system consists of a single belt having its opposite ends mounted to a pair of retractors with a seat belt tongue connected to the belt intermediate to the belt ends. The tongue may be swung across the passenger and engaged with a buckle affixed to the seat thereby positioning one portion of the belt across the lap and another portion of the belt across the chest or upper torso. A passenger may be any occupant of the vehicle, including the driver.

Supplemental restraint systems may be needed by certain passengers such as, for example, infants, children, small passengers, handicapped passengers, race car or stunt car drivers, or any other passenger desiring supplemental restraint. Various types of supplemental restraint systems have been fashioned for use by these users. For example, child seats for infants and booster seats for children between 30 and 60 pounds, mount to a vehicle for restraint of a child. Examples of booster seats are disclosed in U.S. Pat. Nos. 5,797,654 to Stroud, 5,829,834 to Silverman, and 5,685,604 to Kain, which are incorporated by reference herein. An Example of a restraint harness is disclosed in U.S. Pat. No. 5,733,014 to Murray, the disclosure of which is now incorporated herein by reference.

The federal government has mandated that child restraint anchorage systems be installed in most vehicles, including cars, trucks, and certain school buses. These regulations, codified at 49 C.F.R. § 571.225 (FMVSS 225), incorporated herein by reference, require two lower anchor members or anchorages and an upper tether anchor member or anchorage of specified configuration, location and strength parameters. Similarly, 49 C.F.R. § 571.213 (FMVSS 213), incorporated herein by reference, specifies the dimensions of tether hooks used to attach a tether strap to a tether anchorage. Disclosed herein are supplemental restraint systems configured to mount to vehicles using the anchorages specified in 49 C.F.R. §§ 571.225 and 571.213. These supplemental restraint systems may also be compatible with 49 C.F.R. Ch.V, § 571.222, Standard No. 222 (FMVSS 222), which is incorporated herein by reference, and which is applicable to school bus seats. Commonly owned U.S. patent application Ser. No. 10/245,983 discloses supplemental restraint systems for use with a school bus seat in accordance with FMVSS 222.

In one aspect, this invention is a restraining device for mounting an occupant to the seat of a vehicle, such as, for example, a car, a van, or a bus, wherein any such vehicle has at least one rigid member mounted in the bight of the seat between the seat's seat and back portions. The restraining device may be a harness, a belt system, a child seat, or a booster seat, any of which may be configured to utilize any suitable coupling.

Additional features will become apparent to those skilled in the art upon consideration of the following detailed description of illustrative embodiments exemplifying the best mode of carrying out the invention as presently perceived.

DETAILED DESCRIPTION OF THE DRAWINGS

Figure 1:
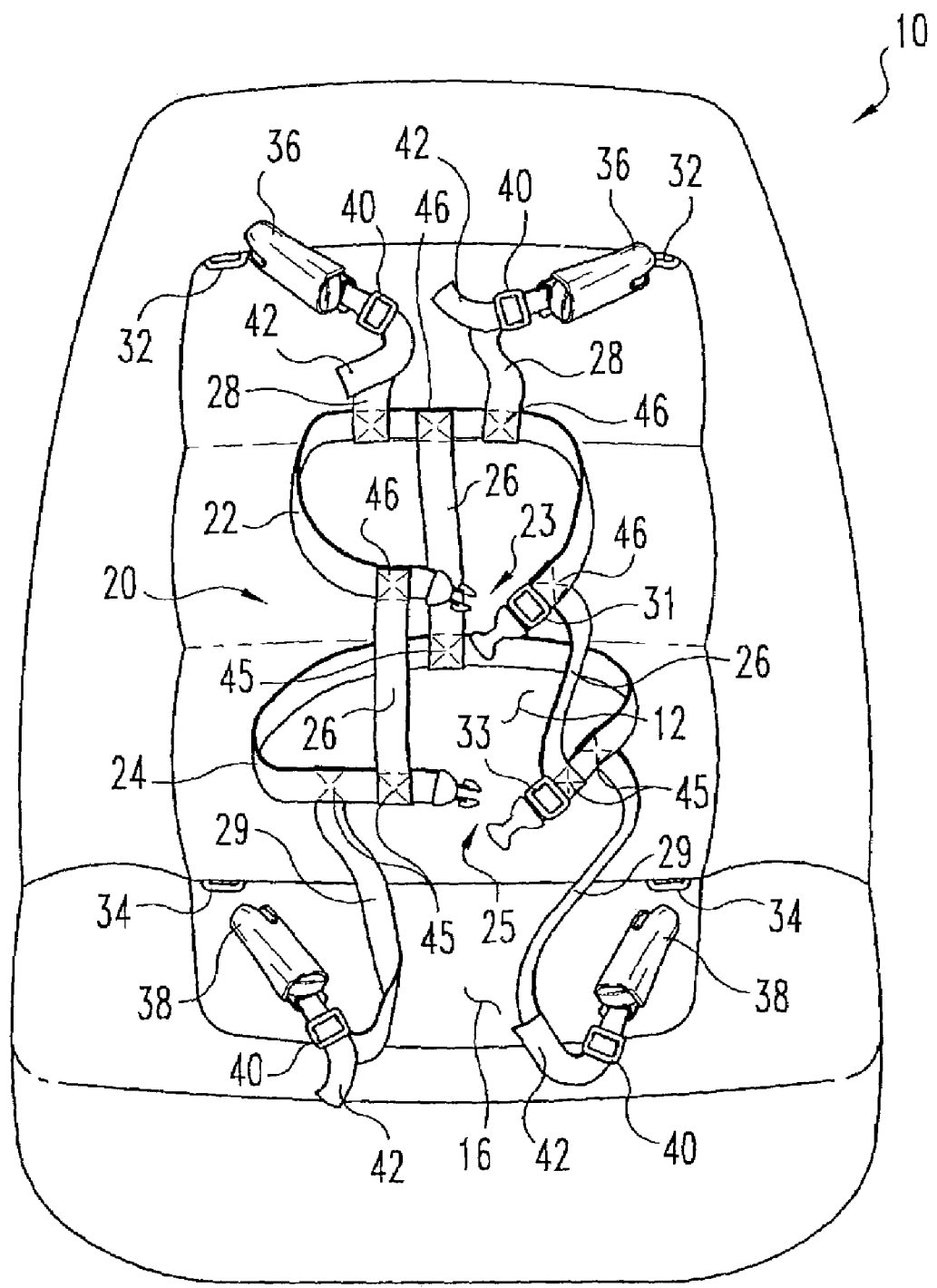
FIG. 1 is a front view of a seat having one illustrative embodiment of a restraint harness incorporating the present invention mounted thereto.

For the purposes of promoting an understanding of the principles of the invention, reference will now be made to the embodiments illustrated in the drawings and specific language will be used to describe same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The drawings depict a number of illustrative embodiments, which will be described now in detail. For ease of reference, the same reference numbers will be used to refer to components common throughout the various embodiments.

Figure 2:
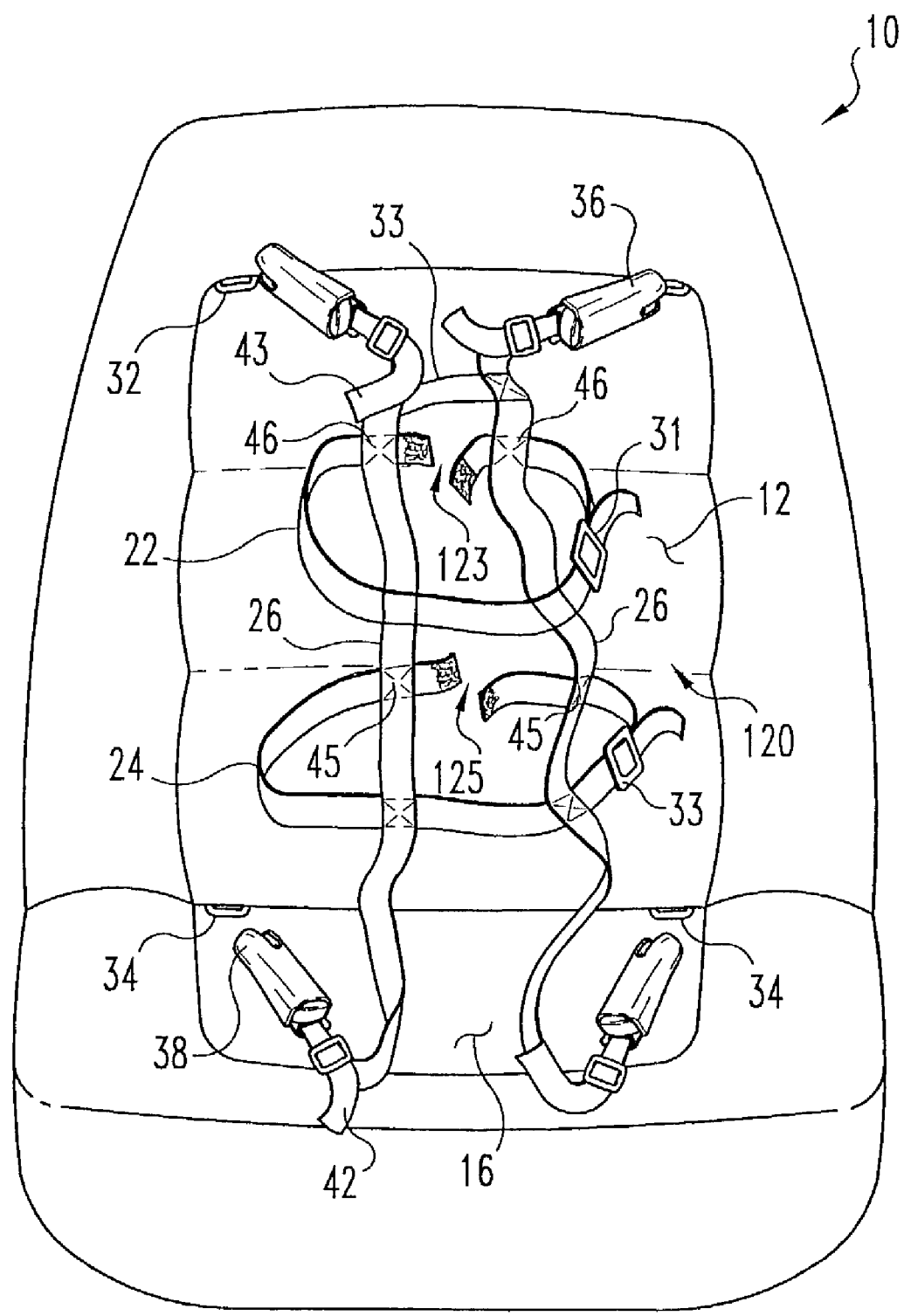
FIG. 2 is a front view of a seat having another illustrative embodiment of a restraint harness incorporating the present invention mounted thereto.
Figure 3:
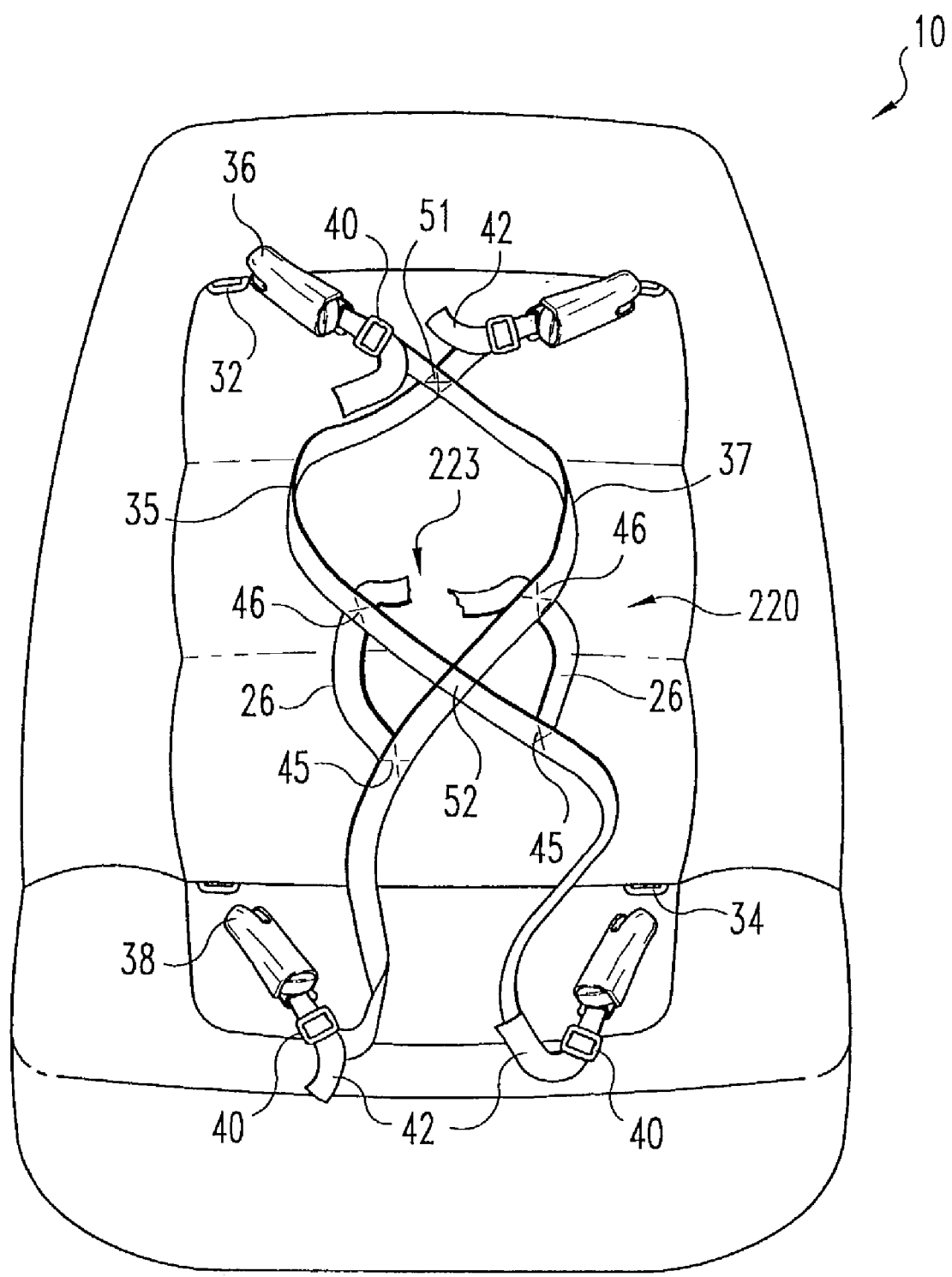
FIG. 3 is a front view of a seat having another illustrative embodiment of a restraint harness incorporating the present invention mounted thereto.

Referring to FIGS. 1–3, illustrative embodiments of positioning harnesses are depicted. In the illustrative embodiment depicted in FIG. 1, the illustrative restraint system or harness 20 is configured for use with a vehicle seat 10 having a generally vertically extending back portion 12 and a generally horizontally extending seat portion 16. As used herein below, vehicle seat 10 in FIGS. 1–3, 6–8 and 15–17 may be any conventional vehicle seat found in for example a car, a van, a truck, an SUV, a boat, an aircraft or a bus or one-half or one-third of a two-passenger or three-passenger seat found in a vehicle.

Restraint harness 20 comprises a pair of spaced apart body straps or web belts 22 and 24, which extend around the body of a wearer of the harness 20. Upper body strap 22 and lower body strap 24 are generally parallel one to the other and each to the seat portion 16. Generally vertically extending and spaced apart connecting straps 26 connect upper strap 22 with lower strap 24. The connecting straps 26 are generally parallel to each other and are generally perpendicular to body straps 22 and 24 and to seat 16. While three connecting straps 26 are shown, alternative embodiments, for example FIG. 2, may use a fewer or a greater number of connecting straps. Similarly, a harness 20 equipped with more than two body straps falls within the scope of the invention. Connecting straps 26 are attached to body strap 24 at attachment points 45 and extend longitudinally upwardly away therefrom to attachment points 46 on body strap 22. Each body strap 22 and 24 is equipped with a connector assembly 23 and 25, which is located at the front of the restraint harness 20, and which is used to secure the opposing ends of respective straps 22 and 24 together in order to mount the harness 20 to the wearer. The respective connector assembly 23 and 25 may also be located at the back (FIG. 2) or on the side of the body strap 22 and 24. Body straps 22 and 24 each further includes a web adjuster 31 and 33 slidably mounted to straps 22 and 24 and configured to adjust the fit of the harness 20 on the wearer. Web adjusters 31 and 33 may be included as a part of the respective connector assembly 23 and 25, or may be mid-belt web adjusters separate from the respective connector assembly 23 and 25. Although not shown, it will be appreciated that connecting straps 26 may also be equipped with web adjusters adapted to adjust the vertical spacing between body straps 22 and 24 in order to further adjust the harness 20 to fit the wearer as known to those skilled in the art.

A pair of spaced apart upper anchor straps 28 are attached to upper body strap 22 at connection points 46 and extend upwardly away therefrom. A pair of spaced apart lower anchor straps 29 are attached to lower body strap 24 at connection points 45 and extend generally downwardly away therefrom. Each anchor strap 28 and 29 has at its end distal from the respective body strap 22 and 24 a coupling mechanism 36 and 38 for releasably mounting the harness 20 to the seat 10.

Seat 10 is depicted with a pair of spaced apart rigid members, or D-ring anchor points 34 mounted in the bight of the seat 10 between the back 12 and seat 16 portions. Anchor points 34 conform to FMVSS 225. Also depicted are upper anchor points 32. Connectors 36 and 38 releasably and lockingly engage anchor points 32 and 34 to mount the restraint system 20 to the seat 10. Each anchor strap 28 and 29 also includes a web adjuster 40 either slidably mounted to the strap 28 and 29 as a mid-belt adjuster, as shown, or integrated into the connector 36 and 38. In operation, each adjuster end 42 of each connector strap 28 and 29 is pulled away from the adjuster 40 in order to reduce the operable length of the connector strap 28 and 29. The upper portions of straps 28 may be configured to fall over the shoulders of the wearer, or under the arms.

Referring now to FIG. 2, another illustrative embodiment of a restraint harness is depicted. Restraint harness 120 is operably substantially similar to harness 20. The illustrative restraint system or harness 120 is configured for use with a vehicle seat 10 having a generally vertically extending back portion 12 and a generally horizontally extending seat portion 16. Restraint harness 120 comprises a pair of spaced apart body straps or web belts 22 and 24, which extend around the body of a wearer of the harness 120. Upper body strap 22 and lower body strap 24 are generally parallel one to the other and with the seat portion 16. Generally vertically extending and spaced apart connecting straps 26 connect upper strap 22 with lower strap 24. The connecting straps 26 are generally parallel to each other and are generally perpendicular to body straps 22 and 24 and to seat 16. While two connecting straps 26 are shown, alternative embodiments may use a greater number of connecting straps. If additional straps 26 are used in this restraint harness, however, they may or may not extend past the body straps 22 and 24. A harness 120 equipped with more than two body straps similarly falls within the scope of the invention. Connecting straps 26 are attached to body strap 24 at attachment points 45 and extend longitudinally upwardly away therefrom to attachment points 46 on body strap 22. Connecting straps 26 continue upwardly from attachment points 46 and downwardly from attachment points 45. Mounted to each opposing end of each connecting strap 26 is a connector 36, 38 configured to lockingly engage corresponding anchor point 32, 34. Each body strap 22 and 24 is also equipped with a connector assembly 123 and 125, which is located at the back of the restraint harness 120 proximate to back portion 12, and which is used to secure the opposing ends of respective straps 22 and 24 together in order to mount the harness 120 to the wearer. Each connector assembly 23 and 25 may also be located at the front (FIG. 1) or on the side of the body strap 22 and 24. Body straps 22 and 24 each further includes a web adjuster 31 and 33 slidably mounted to straps 22 and 24 and configured to adjust the fit of the harness 120 on the wearer. Web adjusters 131 and 133 may be included as a part of the respective connector assembly 123 and 125, or may be mid-belt web adjusters separate from the respective connector assembly 23 and 25. Although not shown, it will be appreciated that connecting straps 26 may also be equipped with web adjusters adapted to adjust the vertical spacing between body straps 22 and 24 in order to further adjust the harness 120 to fit the wearer. In such cases, body straps 22 and 24 would be slidably mounted to straps 26 as opposed to fixedly mounted as by stitching. Harness 120 further includes a generally horizontal strap 33 extending laterally between and attached to connecting straps 26. The upper portions of straps 26 may be configured to fall over the shoulders of the wearer, or under the arms.

Referring to FIG. 3, another illustrative embodiment of a restraint harness 220 is depicted. The illustrative restraint system or harness 220 is configured for use with a vehicle seat 10 having a generally vertically extending back portion 12 and a generally horizontally extending seat portion 16. Restraint harness 220 comprises a pair of continuous body straps or web belts 35 and 37, which extend around the body of a wearer of the harness 220. Each opposing end of each Strap 35 and 37 is equipped with connector assemblies 36 and 38 which are lockingly engageable with anchor points 32 and 34. Strap 35 crosses and is connected to strap 37 at upper location 51 and lower location 52. In addition, straps 35 and 37 are connected at points 45 and 46 by generally longitudinally extending connecting straps 26. Each body strap 35 and 37 is also equipped with a connector assembly 223, which is used to secure the straps 35 and 37 together in order to mount the harness 120 to the wearer. Body straps 35 and 37 each include web adjusters 40 slidably mounted to straps 35 and 37 or integrated with connector assemblies 36 and 38 and configured to adjust the fit of the harness 120 on the wearer. Although not shown, it will be appreciated that connecting straps 26 may also be equipped with web adjusters adapted to adjust the vertical spacing between body straps 35 and 37 in order to further adjust the harness 120 to fit the wearer. In such cases, body straps 35 and 37 would be slidably mounted to straps 26 as opposed to fixedly mounted as by stitching. The upper portions of straps 30 and 31 may be configured to fall over the shoulders of the wearer, or under the arms.

Referring to FIGS. 1–3, the straps 22, 24, 26, 28, 29, 35 and 37 are connected at the respective connection points 45, 46, 51 and 52 using stitching. One skilled in the art will appreciate, however, that alternate connections may be used. For example, hook and loop, rivets, zippers, glue, staples, melting or other suitable connection means may be used. Similarly, although the connection assembly 23, 25 depicted in the illustrative embodiment of FIG. 1 is a standard quick disconnect connector, other connectors, such as, for example, hook and loop 123, 125, 223 (FIGS. 2 and 3), snaps, tongue and buckle, zippers, clamp, or other suitable releasable coupling may be used. So too, alternative connectors may be used, such as for example, the mini-connector depicted in FIGS. 1–3, snap hooks (FIG. 4), tongue and buckle (FIG. 5) or even some type of fixed attachment such as rivets, bolts, brackets and the like. Moreover, a combination of different types of connectors may be used. For example, the mini-connector depicted in FIG. 1 may be used for the lower attachments and a permanent attachment may be used for the upper attachments. The harness 20, 120, 220 may be mounted to a car seat, a boat seat, an airplane seat, a van seat, a bus seat, or the seat of any other vehicle. It will be appreciated that the restraint harnesses 20, 120, 220, may be configured to be worn by a user in or out of the vehicle and then coupled to the anchor members 32, 34 as described above when desired. Finally, although not shown, harness 20, 120, 220 may be equipped with separate shoulder webs or straps.

Figure 4:
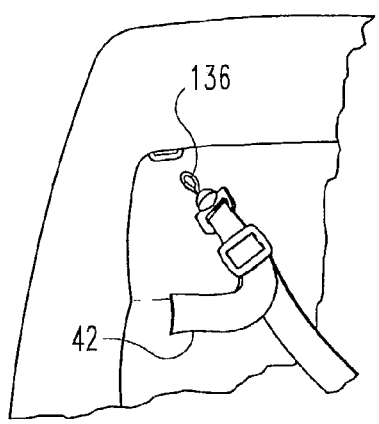
FIG. 4 is a partial front view of an alternative connector for use with any of the embodiments depicted in FIGS. 1–3 and 6–9, 14.
Figure 5:
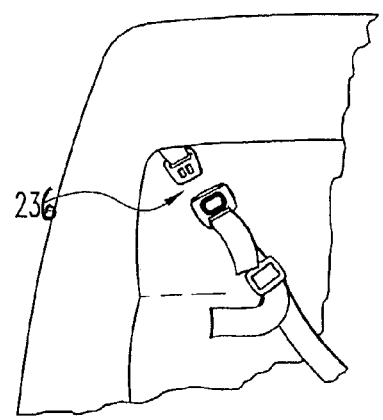
FIG. 5 is a partial front view of another alternative connector for use with any of the embodiments depicted in FIGS. 1–3 and 6–9, 14.

As just noted, FIGS. 4 and 5 depict alternative connector assemblies 136 and 236 for use with either anchor point 32 or 38 of the illustrative embodiments described and shown in FIGS. 1–3. Similarly, connector assemblies 36, 38, 136, and 236 are adaptable for use with the below described supplemental restraint systems 70 (FIG. 6), 170 (FIG. 7), and 270 (FIG. 8), and with add-on child restraint systems as defined in FMVSS 213 such as a booster seat (not shown) or a portable child seat as described below and depicted in FIGS. 14–15. It will be appreciated that the tongue and buckle arrangement in FIG. 5, as well as the arrangement in FIGS. 11 and 13 described below, may be reversed.

Figure 6:
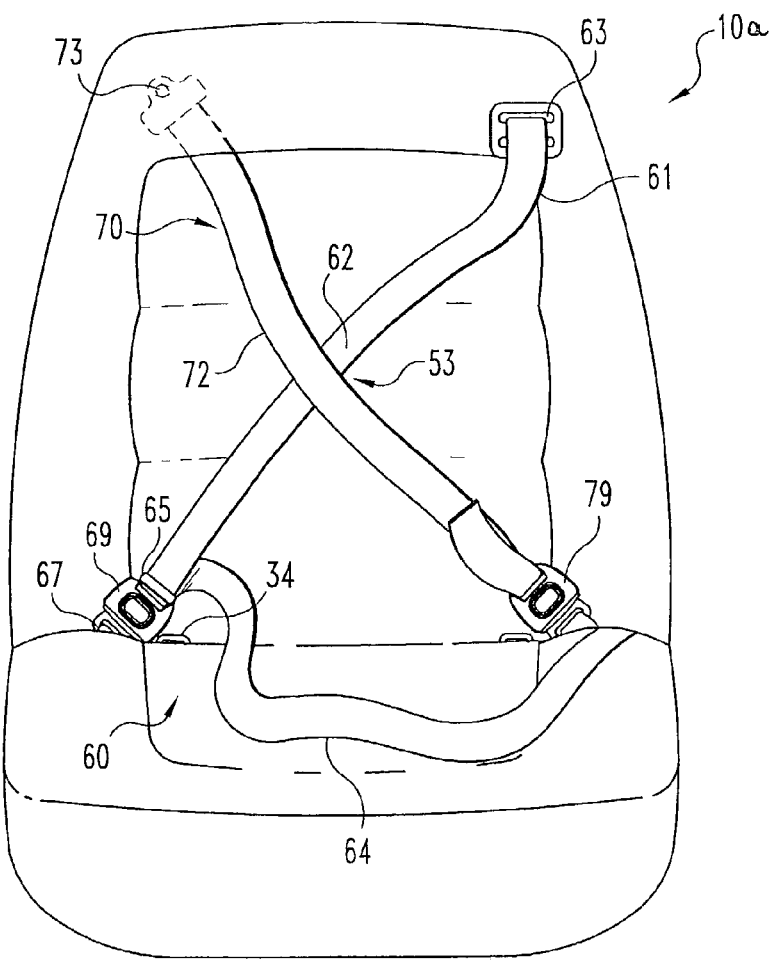
FIG. 6 is a front view of a seat having another illustrative embodiment of a supplemental restraint incorporating the present invention mounted thereto.
Figure 7:
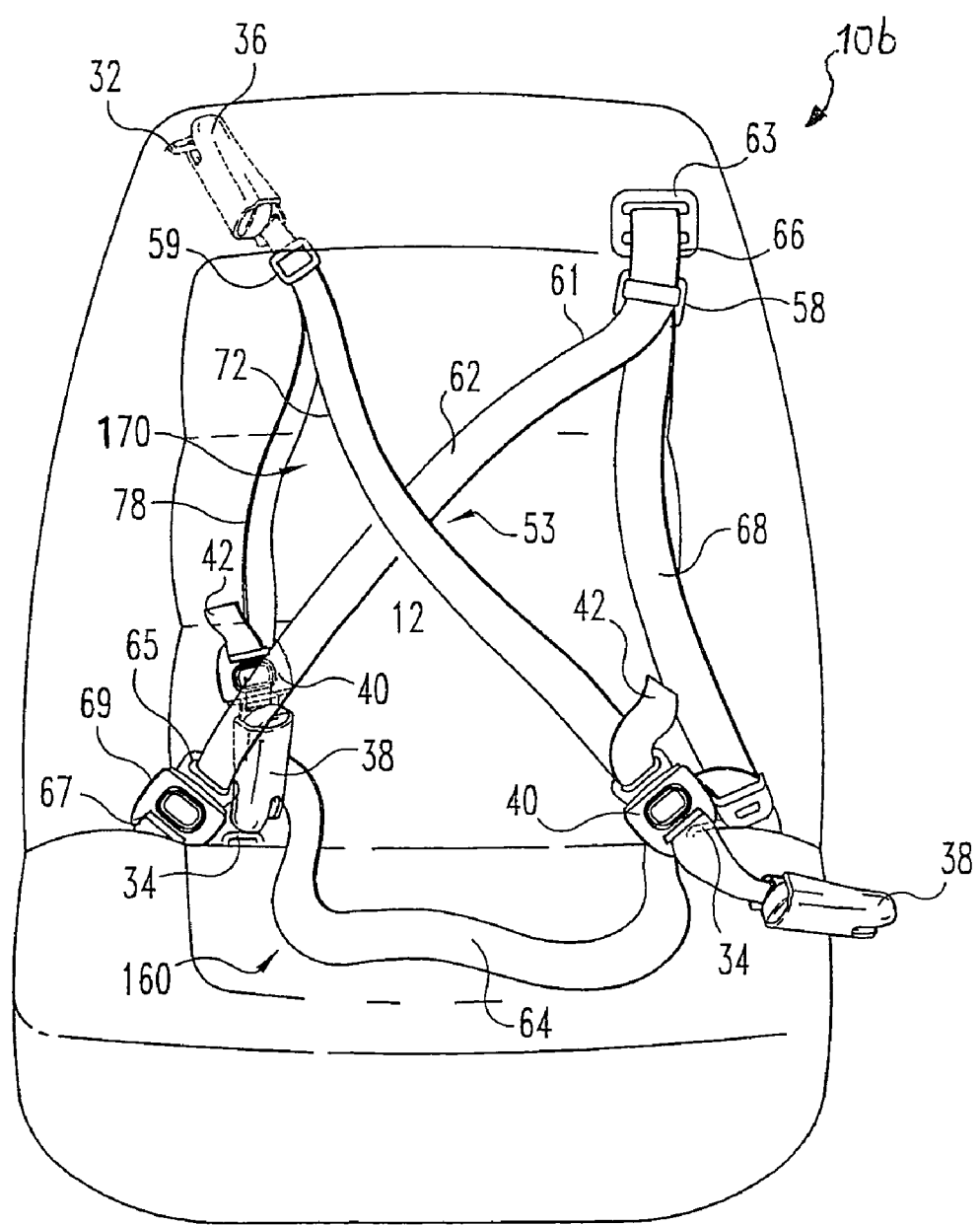
FIG. 7 is a front view of a seat having another illustrative embodiment of a supplemental restraint incorporating the present invention mounted thereto.
Figure 8:
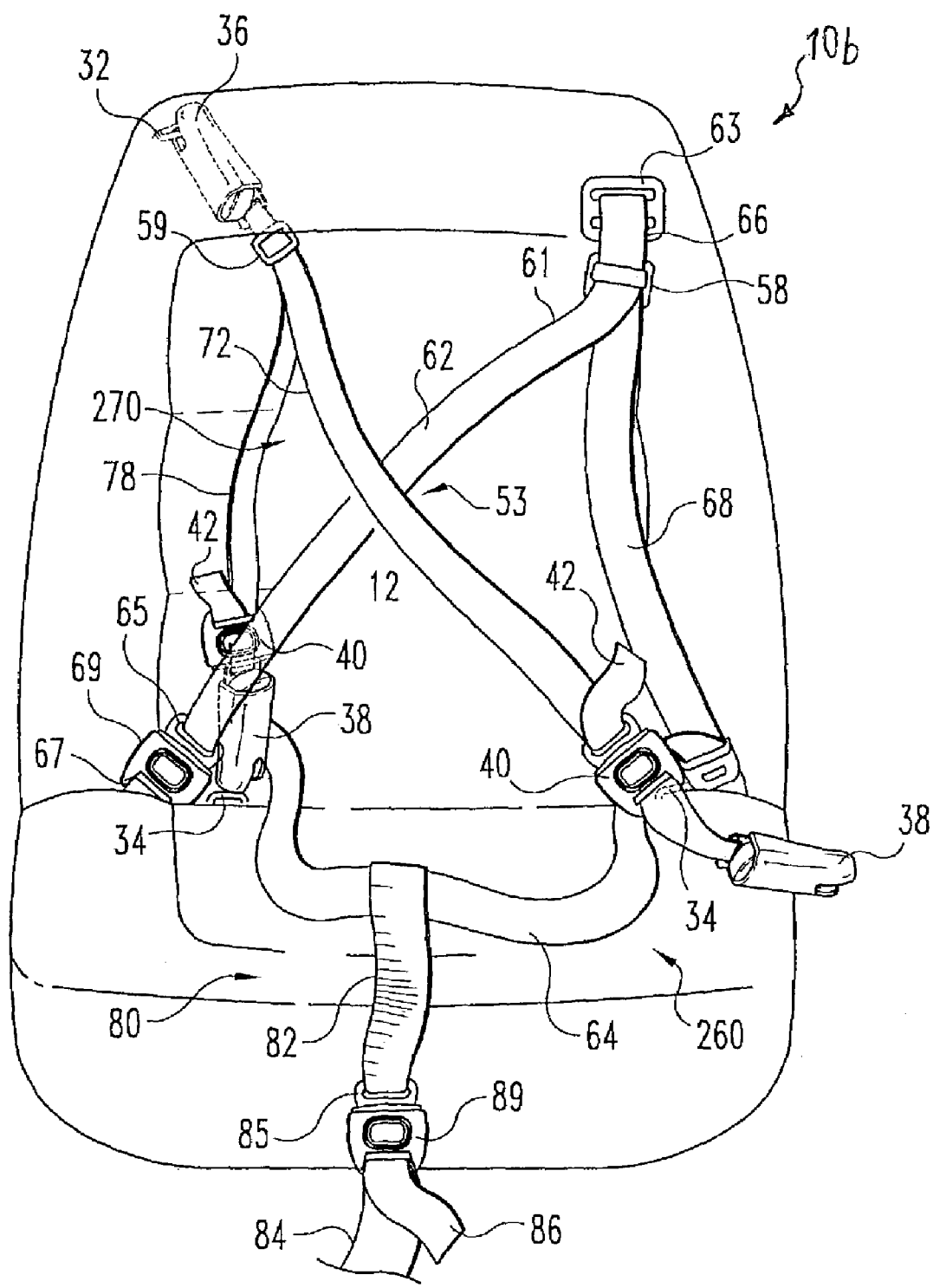
FIG. 8 is a front view of a seat having another illustrative embodiment of a supplemental restraint incorporating the present invention mounted thereto.

Referring to FIGS. 6–8, illustrative embodiments of a supplemental restraint system for use with original equipment manufactured restraint systems are depicted. The illustrative embodiment depicted in FIG. 6 shows conventional restraint system 60 having a belt or web 61 including a chest portion 62 and a lap portion 64. Web 62 is fixedly secured at its proximal end (not shown) to seat 10a and extends outwardly away from aperture 63 and downwardly away therefrom across the torso of the wearer. A conventional belt buckle tongue 65 is slidably mounted to web 62 and is lockingly engageable with seat belt buckle 69. Buckle 69, in turn, is attached by web 67 to seat 10a. Lap portion 64 of web 62 extends laterally away from buckle 65 and is fixedly secured at its distal end (not shown) to seat 10a. Thus, tongue 65 may lockingly engage buckle 69 thereby forcing the torso portion 62 across the shoulder and chest of the occupant residing on the seat and then the lap portion 64 across the lap of the occupant. Restraint system 60 may be equipped with a belt retractor assembly (not shown) or with one or more web adjusters (not shown) configured to adjust the fit of the belt 61 on the occupant. Supplemental restraint system 70 comprises belt or web 72 extending from attachment point 73 downwardly away and transversely across toward connector assembly 79. Connector 79 has an integrated web adjuster configured to adjust the length of web 72 by pulling on adjustment portion 42 to shorten the length. As shown, fixed attachment point 73 comprises a bracket bolted to the seat frame (not shown) and connector assembly 79 is a conventional tongue and buckle configuration; however, it will be recognized that any releasable configuration, such as shown in FIGS. 1–5, may be used. For example, attachment 73 and connection 79 may be configured to take advantage of anchoring device 34 cooperating with a connector 36, 136, 236. Restraint system 60 and supplemental restraint system 70 cross the occupant as generally indicated by point 53 in order to provide cooperating restraint to the occupant. It is equally acceptable for web 72 to cross over the top of web 61, or for web 61 to cross over the top of web 72.

The illustrative embodiment depicted in FIG. 7 shows the supplemental restraint system 170 configured on a seat 10b generic to any vehicle in general and reveals a conventional three-point restraint system 160 having a belt or web 61 including a chest portion 62 and a lap portion 64. Web 61 is fixedly secured at its proximal end (not shown) to seat 10b and extends outwardly away from aperture 63 and downwardly away therefrom across the torso of the wearer. A conventional belt buckle tongue 65 is slidably mounted to the chest portion 62 of web 61 and is lockingly engageable with seat belt buckle 69. Buckle 69, in turn, is attached by web 67 to seat 10b. Lap portion 64 of web 61 extends laterally away from buckle 65 and is fixedly secured at its distal end (not shown) to seat 10b. Thus, tongue 65 may lockingly engage buckle 69 thereby forcing the chest portion 62 across the shoulder and chest of the occupant residing on the seat and then the lap portion 64 across the lap of the occupant. Restraint system 160 may be equipped with a belt retractor assembly (not shown) or with one or more web adjusters (not shown) configured to adjust the fit of the belt 61 on the occupant. Restraint harness 160 further includes a back web or belt 68 extending from aperture 66 downwardly toward the bight of the seat, where belt portion 68 is fixedly attached. Slidably mounted to belts 61 and 68 is height adjuster 58. Height adjuster 58 is configured to associate belts 61 and 68 and slides up and down their length to adjust the position of the belts 61 and 68 on the wearer's shoulder. When properly configured on a wearer, web portion 62 falls over the wearer's chest and web 68 falls over the wearer's back.

Supplemental restraint or positioning system 170 comprises belt or web 72 having upper and lower opposing ends. It will be appreciated that in addition to a belt or web, any other suitable flexible member may be used. Upper opposing end is attached to three-bar slide 59 and lower opposing end is attached to connector assembly 38. Web 72 extends downwardly away from slide 59 transversely across back portion 12 to anchor ring 34, which is releasably engaged by connector 38. Slide 59 is slidably attached to back web or belt 78, and slidably associates webs 72 and 78. Web 78 has opposing ends having connector assemblies 36 and 38 attached respectively thereto. Connector assembly 36 releasably engages attachment point or anchor member 32, and connector assembly 38 releasably engages attachment point or anchor member 34. Web 78 extends downwardly from anchor member 32 longitudinally downward toward anchor member 34. The illustrative embodiment of FIG. 7 depicts each connector 38 in the unengaged position, and connector 36 in the engaged our coupled position. Connectors 36 and 38 may have an integrated web adjuster (not shown) or may have an in-line adjuster 40 configured to adjust the lengths of web 72 and 78 by pulling on adjustment portion 42 to shorten the operative length of web 72 and 78. When properly configured on a wearer, web portion 72 falls over the passenger's chest and web 78 falls down the wearer's back. Restraint system 60 and supplemental restraint system 170 cross each other as generally indicated by location 53 in order to provide cooperating support and restraint to the passenger. When properly configured on the wearer, belts 62 and 72 will fall over the passenger's chest, and belts 68 and 78 will fall down the wearer's back, with adjuster 58 and slide 59 being positioned near to the wearer's shoulders, thereby forming a four-point restraint. It will be appreciated that restraint system 170, in whole or in part, may either underlie or overlie restraint system 160 and vice versa. In other words, belt 72 may cross over belt 62, or belt 62 may cross over belt 72 as desired.

Referring to FIG. 8, another illustrative embodiment is depicted. Supplemental restraint system 270 is substantially similar in operation to restraint system 170 described and depicted in FIG. 7. The vehicle's restraint system 260 is a four-point restraint system which further comprises a crotch assembly 80 having a crotch belt 82 slidably disposed on lap belt 64 and extending longitudinally downwardly therefrom to tongue 85, which is fixedly connected to the distal end of belt 82. Tongue 85 is lockingly engageable with belt buckle 89, which, in turn, is attached (not shown) by web 84 to seat 10b. Web 84 may also be attached to the vehicle's floor or other suitable anchor point. Web 82 lies between the wearer's legs, and has its length, or fit on the wearer, adjusted by pulling on web portion 86. Crotch assembly 80 cooperates with the previously described restraint assemblies 260 and 270 to form a five-point restraint system suitable for use with wearers weighing less than about fifty pounds. This restraint system 270 could also be adapted for use on any vehicle. Also, any of the other herein described combination four-point restraint systems 70, 170 may be configured as a five-point system by adding the crotch assembly 80 to the vehicle's conventional three-point restraint system 60, 160.

Illustratively, web 72 of the restraint or harness positioning systems 170, 270 (FIGS. 7, 8) may have a fully extended operable length measured from the slide 59 to the lower adjuster 40 of between about 35 to 45 inches, and typically about 40 inches. The operable length of web 78 from the connector 36 down to the web adjuster 40 may be between about 20 to 25 inches, and typically about 23 inches fully extended. The operable length between the web adjusters 40 and the connectors 38 on both webs 78, 72 may be in a range from about two to five inches, and typically about three inches. It will be appreciated that other suitable lengths may be used. As noted each of the harness positioning systems 70, 170, 171, may operably cross over or under the chest portion of the vehicle's restraint harness 62, 395 as can be seen by comparing FIGS. 7, 8 with FIG. 9.

Seat 10c (FIG. 9) is configured to accommodate one or more upper anchorage or mount systems 32, 136, 236 described above and/or one or more upper tether, anchorage or mount systems 670, 770, 870, 970, alone or in combination. Illustratively, the upper anchorages 32, 136, 236, 670, 770, 870, 970 are mounted to the seat back 12.

Figure 9:
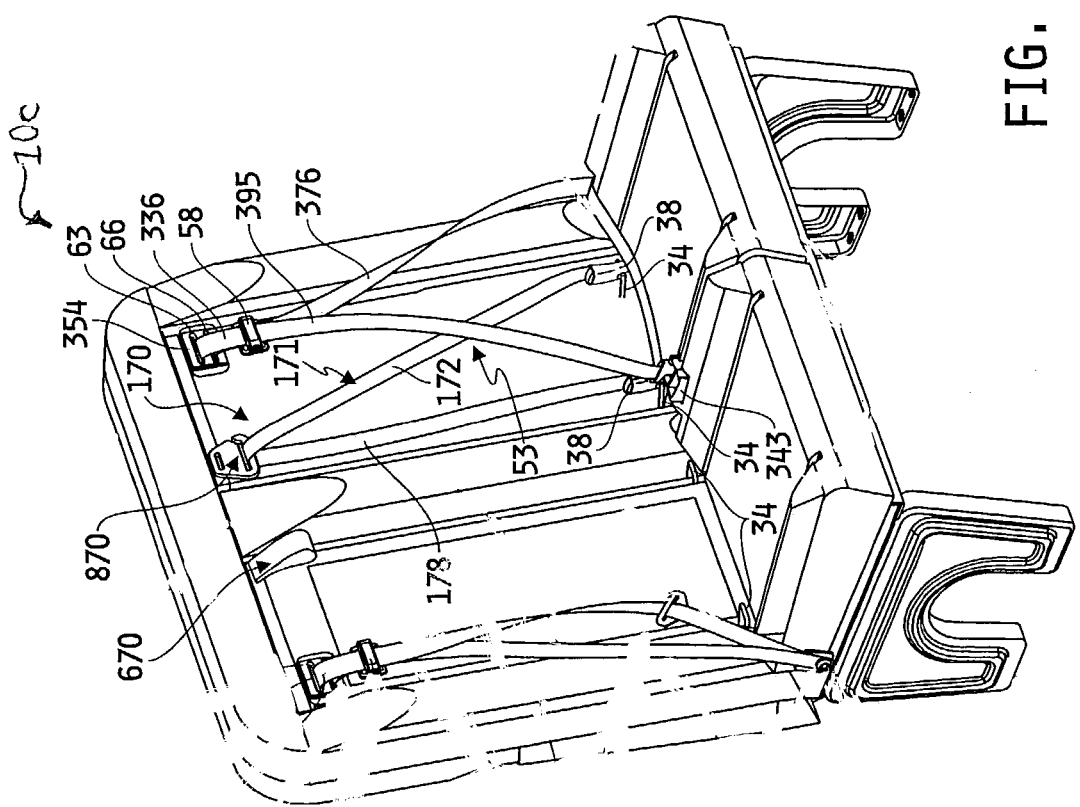
FIG. 9 is a perspective view of a bus seat incorporating another illustrative embodiment of a supplemental restraint according to the present invention.

The upper anchorage systems 670, 770, 870, 970 comprise in combination an anchor member 671 and a turning member 672, 680 to alter or redirect the direction of a web 72, 78, 171 in substantially the same manner. The turning member may be for example a loop of web 672 or a D-ring 680, or other suitable device. For example, in addition to web 72, 78, 171 or other flexible member, the upper anchorage systems 670, 770, 870, 970 may receive a tether strap or web 27 (FIG. 14) proceeding upwardly from a portable child restraint system or seat 10d and redirect the upward path of said strap 27 downwardly toward a lower anchorage or anchor member 34 for coupling therewith in substantially the same manner as with web 171 shown in FIG. 9. In such a case, the lower anchor member 34 will transfer loads from the tether strap to the vehicle structure. It will be appreciated that the tether 27 or other web 72, 78, 171 could also be routed directly through an upper anchorage or anchor member 32 and downwardly to the lower anchor member 34 for anchoring without the use of the upper anchorage system 670, 770, 870, 970. In any case, the illustrative route is depicted in FIG. 9 in conjunction with a positioning harness 171 which will be discussed below.

Figure 10:
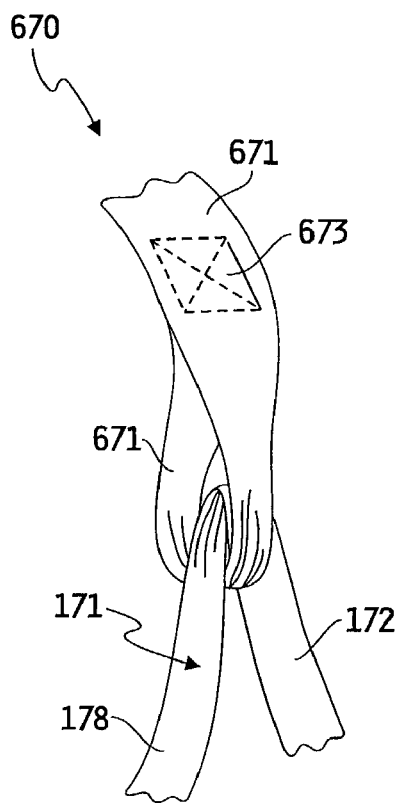
FIG. 10 is a perspective view of an illustrative anchorage system.

The illustrative tether anchorage systems 670, 770, 870, 970 will now be described. Illustratively, upper anchorage system 670 comprises a length of web 671 formed into a turning member comprising a loop 672 at one end by doubling one end of the web 671 back on, and coupling it to, itself as by, for example, stitching 673 (FIG. 10). The other end of the length of web 671 serves as an anchor member and is mounted or attached by any suitable method to the seat back 12. It will be appreciated that web 72, 78, 171 could be threaded through loop 671 in the same manner as described for tether 27 above and as depicted in FIG. 10

Figure 11:
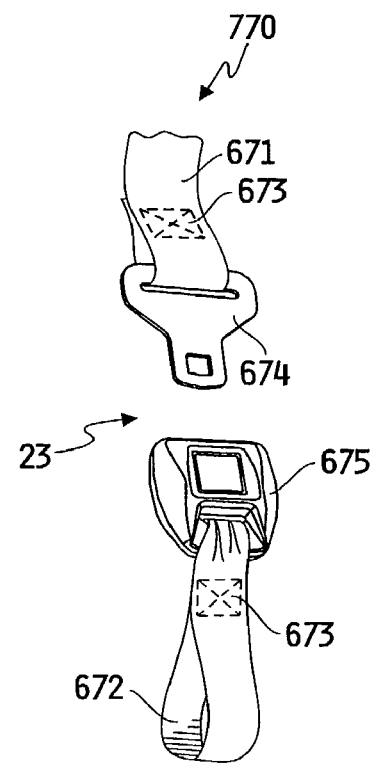
FIG. 11 is a perspective view of another illustrative anchorage system.

In another illustrative embodiment, upper anchorage system 770 comprises an anchor member comprising a length of web 671 coupled at one end to a metal latch plate or tongue 674 (FIG. 11). The anchorage system further comprises a turning member comprising a buckle 675 and a web loop 672 coupled to said buckle 675 as by, for example, stitching 673. The tongue 674 and the buckle 675 are configured for releasable engagement with each other, and their positions may be reversed. The other end of the length of web 671 is attached to the seat back 12 by any suitable method. The web 27, 72, 78, 171 is routed through system 770 in the same manner as with system 670.

Figure 12:
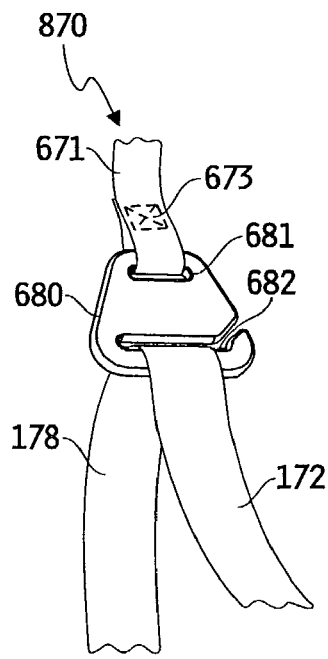
FIG. 12 is a perspective view of another illustrative anchorage system.

Referring to FIG. 12, another illustrative upper anchorage system 870 comprises an anchor member comprising a length of web 671 coupled at one end to a turning member comprising a metal D-ring 680. D-ring 680 is formed to include an open-ended web routing aperture 682 and a web mounting aperture 681, through which the web 671 is threaded and looped back on itself to couple the web 671 and D-ring 680 together by, for example, stitching 673. The web 72, 78, 171 or tether 27 is routed through the aperture 682 to direct its path downwardly for coupling with the lower anchor member 32. The other end of web 671 is mounted to seat back 12 by any suitable method.

Figure 13:
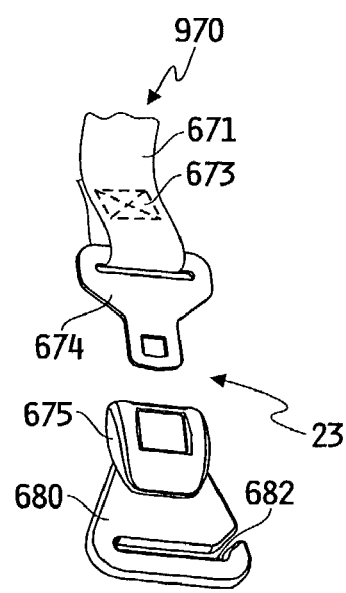
FIG. 13 is a perspective view of another illustrative anchorage system.

Another illustrative embodiment is depicted in FIG. 13. Upper anchorage system 970 illustratively comprises an anchor member comprising a length of web 671 coupled at one end to a metal latch plate or tongue 674. The upper anchorage system 970 further comprises a turning member comprising a metal D-ring 680 coupled to a buckle 675 as by, for example, rivets, it being appreciated that an intervening web (not shown) could couple the buckle 675 and the D-ring 680 together, as by, for example, stitching. D-ring 680 is formed to include an open-ended web routing aperture 682 through which a web, such as web 72, 78, 171 or tether 27, is routed in order to change the direction of any such web or tether. The tongue 674 and the buckle 675 are configured for releasable engagement with each other and their positions may be reversed. The other end of the length of web 671 is attached to the seat back 12 by any suitable method.

It will be appreciated that the D-ring 682 may be made of any suitable metallic material, such as die-cast from zinc or stamped from steel, and that it may be overmolded with another material, such as plastic, to protect any web, such as tether 27 or web 72, 78, 171, from sharp edges. Alternatively, the D-ring 682 may be fashioned out of any suitable metallic, non-metallic or composite material or combination thereof. Each of the couplings and attachments mentioned above in conjunction with systems 670, 770, 870, 970 could be accomplished using any suitable method including, for example, rivet, screw, nail, glue, stitching or melting.

Referring to FIG. 9, the harness positioning or restraining system 170 will be more fully described. As noted, harness 170 Seat 700 may further comprise a harness positioning system 170 is configured for use with any one of anchorage systems 670, 770, 870, 970 or directly with anchor members 32, 136, 236. Positioning harness 170 comprises a length of web 171 having a chest or torso portion 172, a back portion 178, and opposite ends each coupled to a connector 38. The positioning harness 170 is releasably engaged or mounted on the seat as follows. The connector 38 coupled to one end of the web 171 is releasably engaged with the anchor member 34 distal from buckle 343. The web 171 then proceeds from said distal anchor member 34 upwardly and diagonally toward upper tether mount 870 or other illustrative upper tether system mount 670, 770, 970 (FIGS. 10–13) continuing therethrough and downwardly away therefrom continuing downwardly along the seat back 12 to the anchor member 34 proximal to buckle 343 where the connector 38 on the other end of web 171 is releasably engaged with said proximal anchor member 34. A height adjuster (not shown) similar to height adjuster 58 may be slidingly mounted to chest portion 172 and back portion 179. It will be appreciated that the connector 38 at either end of the web 171 may be engaged with its respective round bar or other anchor member 34 first, or that they may be connected at the same time.

Harness 170 is operationally engaged about a passenger (not shown) as follows. One end of web 171 is releasably engaged with the distal anchor member 34. The web 171 then proceeds upwardly over the torso of an occupant or passenger and through the upper anchorage system 670, 770, 870, 970 or anchor member 32, 136, 236 and downwardly away therefrom continuing downwardly behind the passenger to releasably engage the other connector 38 with the proximal anchor member 34. Then, the vehicle three-point restraint system 336, or other conventional restraint harness 60, 160, 260, is releasably engaged about the passenger, crossing over the positioning harness 170 generally at point 53. It will be appreciated, that the order of engagement and/or the crossing of the webs 171 and 60, 160, 260, 336 may be reversed. For example, the illustrative positioning harnesses depicted in FIGS. 6–8 and explained above show the chest portion 72 crossing over chest portion 62 of the vehicle harness 60, 160, 260. However engaged about a passenger, the positioning harness 170 will position a passenger for beneficial and cooperative use of harness 60, 160, 260, 336 for restraint of the passenger. Those skilled in the art will further appreciate that a crotch belt could be added to web 336 as, for example, is shown and described in FIG. 8.

Figure 14:
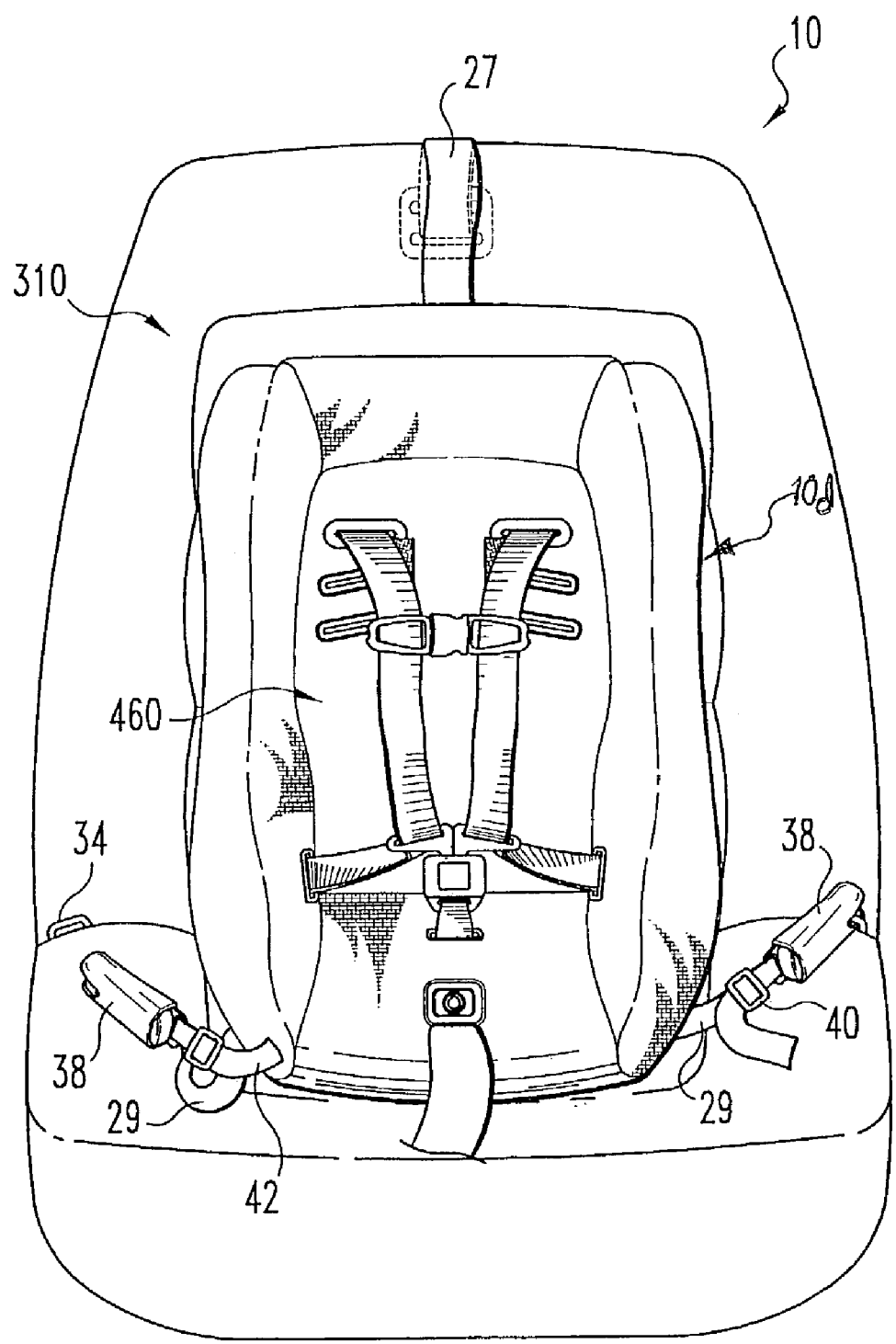
FIG. 14 is a front view of a child seat mounted to a vehicle seat incorporating one illustrative embodiment incorporating the present invention.
Figure 15:
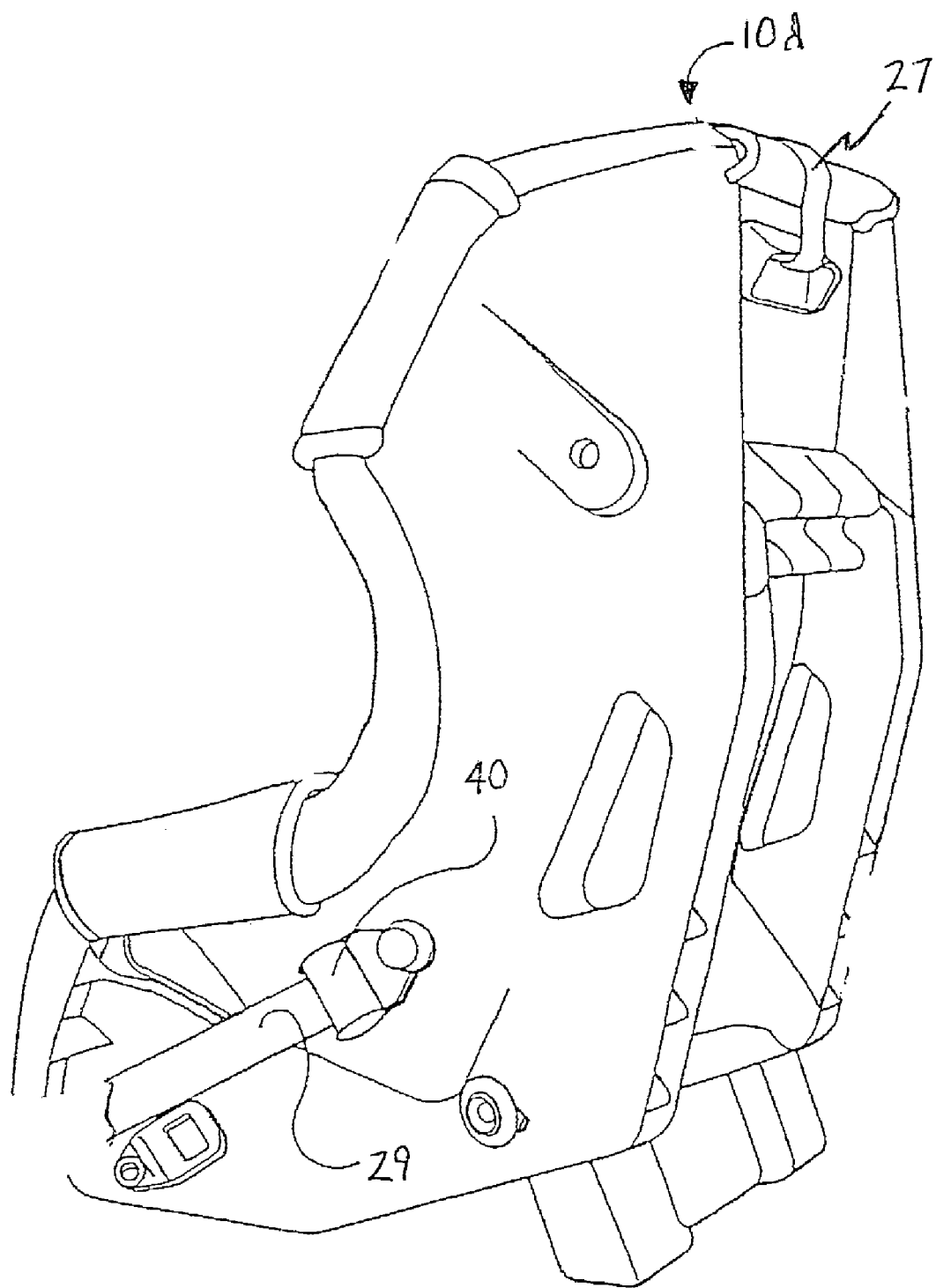
FIG. 15 is perspective view of the child seat of FIG. 14 showing the upper tether connected to the child seat.

Referring now to FIGS. 14, 15, an illustrative embodiment of an add-on child restraint system, as defined in FMVSS 213, illustratively a portable child seat 10d is depicted mounted to a vehicle seat 10, 10a–10c as described herein and as adaptable for use with any vehicle seat. The portable child restraint seat 10d illustratively includes a child restraint anchorage system comprising the above mentioned upper tether strap 27 and two lower anchor straps 29. As just described, the upper anchorage mounts 670, 770, 870, 970 and anchor members 32, 136, 236 are configured for use with tether strap 27. Alternatively, the strap may be equipped with a connector assembly 38 as described herein to provide releasable engagement with an upper anchor member 32. In any event, tether strap 27 may be equipped with a mid-belt or integrated adjuster (not shown) to provide proper fit to the strap 27 in operational engagement. The mounting of the add-on child seat 10d is completed by coupling the lower anchor straps 29 with lower anchor members 34 as follows. The lower anchor straps 29 are attached, either fixedly or removably, to the seat 10d. The distal end of each strap 29 is configured with a connector assembly 38, which lockingly engages anchor member 34 to mount the portable seat 10d to vehicle seat 10, 10a–10c. Web adjusters 40, which may be in-line mid-belt adjusters or adjusters integrated into connectors 38, are used to provide proper fit of straps 29 in operational engagement by, for example, decreasing the length of connecting straps 29 when adjustment portions 42 are pulled away from the adjusters 40 thereby firmly securing the seat 10d to vehicle seat 10, 10a–c. Thus, portable child seat 10d may be mounted to any vehicle seat 10, 10a–c. The restraint of the occupant of the portable child seat 10d is provided by the restraint system 460 integral to the particular seat 10d.

The add-on child restraint may also take the form of a booster seat (not shown), which may also be attached using straps 29 as just described, with child restraint being provided by either the vehicle restraint system 60, 160, 260, or the restraint system integral to the booster seat. Moreover, any of the positioning and restraining harnesses 20, 60, 120, 160, 170, 220, 260 may be used alone or in cooperation with any of the vehicle restraint systems 60, 160, 260 and the booster seat to restrain the passenger.

As briefly explained above, web 171 and portable child restraint seat 10d may also be mounted to the vehicle seat 10, 10a–c using other suitable anchorage systems such as for example systems 136, 236. For example, connector 136, which comprises a snap hook or other connector configured to mount to a length of web 171, 27 either directly or through another length of web coupled with a web adjuster 31, may be used to couple web 171, 27 to an upper anchor member 32. Web portion 172 illustratively could be mounted through an adjuster 31 and extends therefrom downwardly behind a passenger or occupant (not shown) for coupling with anchor member 34 as described above. It will be appreciated that the connector 36 disclosed above could be configured for use as depicted with web 171 and used in substantially the same way with tether 27. Similarly, coupling assembly or connector 236 comprises a conventional tongue attached to the vehicle seat back 12, and configured to releasably couple with a buckle attached to a length of web such as web 171, 27 either directly or through another length of web coupled with a web adjuster 31. Web portion 172 is threaded through adjuster 31 and extends therefrom downwardly behind an passenger (not shown) for coupling with anchor member 34 as described above. Coupling assembly 236 is also configurable for use with tether 27 described above. Moreover, these connectors 136, 236 may be used in conjunction with upper tether anchor systems 670, 770, 870, 970. For example, the tongue of connector 236 could be attached, as by sewing, to web 671 of one of the upper tether mounts 670, 770, 870, 970. In such a case, a positioning harness, such as positioning harnesses 70, 170, 270, could be configured with a buckle to engage the tongue as described above, and a tether 27 could be configured for use with the various anchor members and systems.

The interchangability of the components of the illustrative embodiments described herein will be appreciated by those skilled in the art. The above described systems are configurable for use in any number of vehicles including automobiles, SUVs, vans, mini-vans, mini-buses, and school buses and the seats utilized therein. It will also be appreciated that the anchor members 32 and 34 may be removable or integral to the vehicle seat, and that the restraint systems mounted thereto and described and depicted herein may also be either removable or integral to the vehicle seat.

An example of a suitable web adjuster 31, 33, 40 described herein for use with any of the above systems illustratively may be of the kind disclosed in commonly owned U.S. patent application Ser. No. 10/206,660 filed by Woodard et al. on Jul. 26, 2002, the disclosure of which is no expressly incorporated herein by reference. An example of a suitable connector 36, 38 described herein for use with any of the above systems illustratively may be of the kind disclosed in commonly owned U.S. patent application Ser. No. 10/206,603 filed by Wiseman et al. on Jul. 26, 2002, which is now expressly incorporated herein by reference. Any other suitable conventional connector may be used as well.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A harness for restraining a passenger in a vehicle seat having a seat back and a seat bottom defining a bight therebetween, the harness comprising:
    a first web having opposing ends, the first web configured to extend at least partially across the seat back;
    a first connector joined to one end of the first web and configured for releasable attachment to a first anchor member secured to the vehicle seat;
    a second connector joined to an opposite end of the first web and configured for releasable attachment to a second anchor member secured to the vehicle seat;
    a second web having one end joined to the first connector and a second opposite end; and
    a third connector joined to the opposite end of the second web and configured for releasable attachment to a third anchor member secured to the vehicle seat.

2. The harness of claim 1 wherein the first anchor member is positioned at an upper portion of the seat back near one side thereof, and the second anchor member extends from the bight near an opposite side of the seat back, the first web extendable diagonally across the seat back between the first and second anchor members.

3. The harness of claim 1 wherein the first and second anchor members are rigidly secured to the vehicle seat in accordance with Federal Motor Vehicle Safety Standard (FMVSS) 225.

4. The harness of claim 1 wherein the first web has an adjustable length between the opposing ends thereof.

5. The harness of claim 1 wherein the vehicle seat is further equipped with a three-point seat belt system, and wherein the harness is configured to cooperate with the three-point seat belt system to form a four-point seat belt system for restraining a passenger in the vehicle seat.

6. The harness of claim 1 further including a slide coupled to the first and second webs near the first connector, the slide slidably associating the first and second webs.

7. The harness of claim 1 wherein the first anchor member is positioned at an upper portion of the seat back near one side thereof, and the second anchor member extends from the bight near an opposite side of the seat back, the first web extendable diagonally across the seat back between the first and second anchor members;
    and wherein the third anchor member extends from the bight near the one side of the seat back, the second web extendable along the seat back between the first and third anchor members.

8. The harness of claim 1 wherein the first, second and third anchor members are rigidly secured to the vehicle seat in accordance with a Federal Motor Vehicle Safety Standard (FMVSS) 225.

9. The harness of claim 1 wherein the first and second webs each have an adjustable length between the opposing ends thereof.

10. The harness of claim 1 wherein the vehicle seat is further equipped with a three-point seat belt system, and wherein the harness is configured to cooperate with the three-point seat belt system to form a four-point seat belt system for restraining a passenger in the vehicle seat.

11. A harness for restraining a passenger in a vehicle seat having a seat back and a seat bottom defining a bight therebetween, the vehicle seat including a vehicle restraint system having a chest portion and a lap portion, the harness comprising:
    a first web having opposing ends,
    a first connector joined to one end of the first web and configured for releasable attachment to a first anchor member secured to the vehicle seat,
    a second connector joined to an opposite end of the first web and configured for releasable attachment to a second anchor member secured to the vehicle seat,
    a second web having one end joined to the first connector and a second opposite end, and
    a third connector joined to the opposite end of the second web and configured for releasable attachment to a third anchor member secured to the vehicle seat,
    wherein at least a portion of the first web is generally positioned to cross the chest portion of the vehicle restraint system when the harness is attached to the vehicle seat.

12. The harness of claim 11 wherein the first anchor member is positioned at an upper portion of the seat back near one side thereof, and the second anchor member extends from the bight near an opposite side of the seat back, the first web extendable across the seat back along a first diagonal direction between the first and second anchor members, and the chest portion of the vehicle restraint system extendable across the seat back along a second diagonal direction such that the first web crosses the chest portion.

13. The harness of claim 11 wherein the first and second anchor members are rigidly secured to the vehicle seat in accordance with Federal Motor Vehicle Safety Standard (FMVSS) 225.

14. The harness of claim 11 wherein the first web has an adjustable length between the opposing ends thereof.

15. The harness of claim 11 wherein the vehicle restraint system is a three-point restraint system.

16. The harness of claim 11 further including a slide coupled to the first and second webs near the first connector, the slide slidably associating the first and second webs.

17. The harness of claim 16 wherein the first anchor member is positioned at an upper portion of the seat back near one side thereof, and the second anchor member extends from the bight near an opposite side of the seat back, the first web extendable diagonally across the seat back between the first and second anchor members; and wherein the third anchor member extends from the bight near the one side of the seat back, the second web extendable along the seat back between the first and third anchor members.

18. The harness of claim 17 wherein the chest portion of the vehicle restraint system is extendable diagonally across the seat back in a direction opposite the first web such that the first web crosses with the chest portion.

19. The harness of claim 11 wherein the first, second and third anchor members are rigidly secured to the vehicle seat in accordance with Federal Motor Vehicle Safety Standard (FMVSS) 225.

20. The harness of claim 11 wherein the first and second webs each have an adjustable length between the opposing ends thereof.

21. The harness of claim 11 wherein the vehicle seat is a three-point restraint system.

* * * * *